Patented Aug. 4, 1942

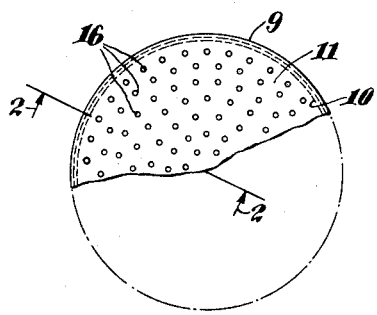
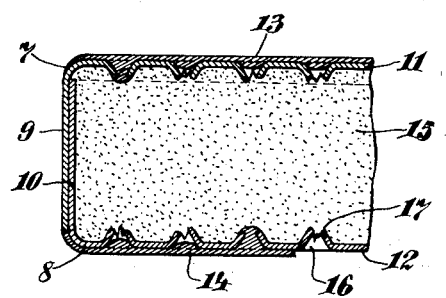
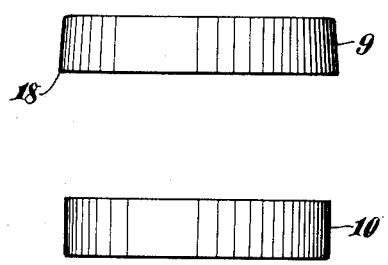
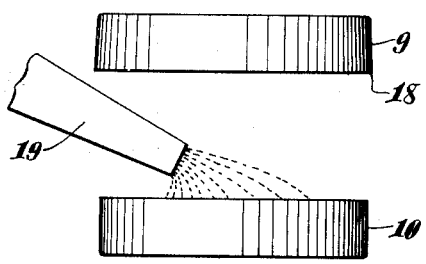
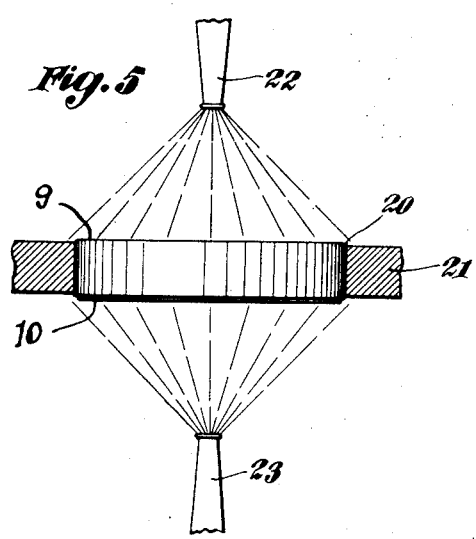

2,292,101

UNITED STATES PATENT OFFICE 2,292,101

BEVERAGE CARTRIDGE

William Francis Brown, Flushing, N. Y.

Application April 22, 1941, Serial No. 389,715

5 Claims. (Cl. 99—77.1)

The invention here disclosed relates to the packaging of materials, such as coffee, tea or other beverage or food materials in containers suitable for extracting purposes and is related to the inventions disclosed and claimed in prior applications, Serial #230,915, filed September 21, 1938; Serial #360,570, filed October 10, 1940, and Serial #367,979, filed November 30, 1940.

Special objects of the present invention are to provide a form of cartridge for coffee and other materials which will be inexpensive, easily manufactured and packed, readily sealed to hold the more volatile products and to keep the contents in a fresh, full flavored state, which will not require the use of filter paper or equivalent means, which will permit instant penetration and flow of the extracting fluid, which will hold the ground coffee or other extract material and which, if desired, as in the case of coffee, for example, will permit a certain percentage of the finer or pulverized material to pass along into the extract so as to give a desired body, color and like effect.

Other desirable objects and the novel features of the invention will appear or are hereafter definitely set forth.

The drawing accompanying and forming part of the following specification illustrates practical features of the invention. Structure may be modified and changed as regards such illustration, however, all within the true intent and broad scope of the invention as hereinafter defined and claimed.

Figure 1 is a broken plan view of one commercial embodiment of the invention.

Figure 2 is an enlarged broken sectional view as on the plane of line 2—2 of Figure 1.

Figure 3 is a side view showing how the two shells constituting the component part of the cartridge may be formed in spaced relation one above the other.

Figure 4 is a similar view showing how at a subsequent stage a charge of the ground coffee or other material being packed may be measured into the lower shell.

Figure 5 is a side view showing how the assembled shells seated in a cavity in a table or other form of carrier may be sprayed with a medium to seal the enclosed contents.

In Figures 1 and 2, the complete cartridge is shown as consisting of upper and lower cupped shells 7 and 8 having substantially cylindrical rims 9, 10 telescopically engaged and punctured top and bottom walls 11, 12 coated with layers of sealing material 13, 14 and containing a charge of ground coffee or other packed material 15.

A special and important feature of the invention is that the substantially flat walls of the shells, instead of being perforated by punched openings are made pervious by puncturing the same, as by more or less sharp needles, to provide inwardly tapered openings 16 with ragged, sharp-edged torn edges 17.

The shape, extent of protrusion, size of opening at the torn inner edges and other characteristics will depend upon the character of the puncturing points, the nature of the cartridge material and other factors.

In a present preferred embodiment, cotton linter vulcanized fiber is used as the shell material and the puncturing is effected by closely spaced sharp needles.

The shells at present are blanked out and cupped in a forming machine in the relation represented in Figure 3; that is, one above the other, the upper shell being slightly larger or flared sufficiently, as indicated at 18, so that it will telescope down over the lower shell after the latter has received a charge of the material being packed.

The puncturing may be effected in the same machine and either before or after or as a part of the cupping operation. At present, the puncturing needles are driven in through guide openings in the punch heads substantially at the completion of the cupping operation, but these steps are subject to variation.

With a stiff sheet material such as vulcanized fiber, it is usually desirable to soften the material as by heat or moisture, before or during the cupping operation. At present, a desirable amount of softening is accomplished by heating the dies, but steam may be used as a substitute, it providing moisture as well as heat.

The softening of the paper-like fibrous material, as by heat or moisture or both heat and moisture causes the material to draw out under the puncturing action, creating attenuated fibrous extensions around the edges of the openings, which screen and hold back the smaller particles of the packed material. Usually, however, the small openings left at these rough inner edges will be of sufficient size to pass enough of the finely pulverized coffee or other material to give desired color, taste and body to the extracted beverage.

In the machines at present employed, after the shells are formed and punctured as in Figure 3, they pass on to a subsequent station where, Figure 4, a spout 19 or the like, delivers a measured charge of the material into the bottom shell.

After the charging operation, the shells are telescoped and if desired, the rim of the top shell rolled down in close fitting engagement over the bottom shell and the assembly squeezed into a seat or recess 20 provided in a table or carrier 21.

At this same or subsequent station, the upper and lower punctured faces of the cartridge are sealed as by sprays of sealing medium from the nozzles 22, 23.

While different sealing materials may be employed, a quick-drying gelatinous solution has been found practical and desirable. Only a light coating or filling of this material is required to seal the small punctured openings and such material is tasteless, odorless, inert and dissolves immediately to the extracting fluid such as boiling water and steam.

If desired, the shells may be interiorly or exteriorly coated with sealing medium in advance of the filling operation. In particular, the bottom shell such as shown in Figure 3 may have the openings therein sealed before the material is charged therein, as in Figure 4, so as not to lose any of the finer ground or pulverized fraction.

The inwardly tapered openings have the twofold advantage of freely admitting the extracting liquid at one side and of impeding and preventing escape of solid material at the opposite side of the cartridge.

The telescopically engaged rim portions of the shells reinforce each other and give a definite solidity to the article, enabling it to withstand the pressure required in clamping it in the extraction apparatus while, as in the case of a coffee maker, the hot boiling water under pressure of generated steam, is being forced through the cartridge contents.

The inwardly projected conically extended rough-edged openings or passages, by trapping and holding the material against escape, eliminate the need for filter paper or other filtering medium and this avoiding any handling of filter paper is a great advantage in the manufacture of the cartridge since the necessity for handling the light, flimsy filter paper has been a distinct disadvantage in the cartridge packing of materials heretofore. Also, without the filter paper, the flow of extracting fluid through the cartridge can be practically instantaneous, resulting in a better product and with no delay in action.

The vulcanized fiber or other paper-like material is tasteless, odorless and non-affected by and of no effect upon the packed material and is impervious to the hot water or other extracting liquid and is stiff and strong enough to hold its shape throughout the packing, shipping and other handling stages and for the short extracting period during which it may be subjected to mechanical clamping pressure as well as to the pressure of hot liquid and steam.

The shells which make up the cartridges are inexpensive in themselves and may be produced and packed at low cost. The inwardly convergent pierced openings form conical seats for the sealing material which the more readily enters and seals these openings; the torn and ragged inner edges of the passages also may provide irregular key-like elements interlocking with and binding the sealing medium in place.

What is claimed is:

1. A holder for material to be extracted, comprising a container of fibrous paper-like material having inwardly projecting conical passages terminating in rough torn edges inside the container and forming integral inwardly convergent individual screening elements for trapping and holding material packed within the container.

2. A holder for material to be extracted, comprising a cartridge having inwardly pierced conical openings surrounded by inwardly convergent torn ragged material trapping edges.

3. A cartridge for material to be extracted, consisting only of two telescopically engaged cup-like shells of thin sheet material with pierced inwardly convergent openings surrounded by rough torn material trapping edges.

4. A cartridge for material to be extracted, consisting only of two telescopically engaged cup-like shells of thin sheet material with pierced inwardly convergent openings surrounded by rough torn material trapping edges and a water soluble sealing agent closing said conical openings.

5. A holder for material to be extracted, comprising a container of vulcanized fiber having inwardly pierced openings projecting convergently inward into the body of the container and having rough torn ragged edges at the inner smaller ends of the passages inside the holder to trap granular material within the container while freely admitting liquid for infusion purposes.

WILLIAM FRANCIS BROWN.